United States Patent [19]

Petrovich et al.

[11] 3,899,388

[45] Aug. 12, 1975

[54] TREATING COMPOSITIONS

[75] Inventors: John P. Petrovich; David L. Taylor, both of St. Louis, Mo.

[73] Assignee: Monsanto Company, St. Louis, Mo.

[22] Filed: Feb. 26, 1973

[21] Appl. No.: 335,614

[52] U.S. Cl. ............... 162/164; 8/115.6; 8/116 P; 8/181; 117/155 UA; 162/158; 260/29.6 MP
[51] Int. Cl. ............................................. D21d 3/00
[58] Field of Search .......... 162/164, 166, 158, 181; 260/29.6 MP, 29.2 EP, 502.4 P, 502.5, 2 BP; 117/155 UA; 8/115.6, 116 P, 181

[56] References Cited
UNITED STATES PATENTS

| | | | |
|---|---|---|---|
| 2,595,935 | 5/1952 | Daniel et al. | 162/164 |
| 2,834,675 | 5/1958 | Jen et al. | 162/164 |
| 3,391,090 | 7/1968 | Schiegg | 260/29.2 EP |

OTHER PUBLICATIONS

Casey, "Pulp & Paper", Vol. II, 2nd Ed., p. 741.

*Primary Examiner*—S. Leon Bashore
*Assistant Examiner*—Peter Chin
*Attorney, Agent, or Firm*—N. E. Willis; J. E. Maurer; F. D. Shearin

[57] ABSTRACT

Compositions comprising (I) reaction products of (A) adducts of certain dihaloalkanes and polyalkylenepolyamines and (B) certain epihalohydrins, (II) polyanionic phosphorus compounds and (III) water. Such compositions may be added to cellulosic substrates to increase wet and dry strength.

19 Claims, No Drawings

TREATING COMPOSITIONS

BACKGROUND OF THE INVENTION

1. Field of the Invention

This invention relates to compositions of matter containing cationic thermosetting resinous reaction products and certain polyanionic phosphorus compounds. It also relates to cellulosic substrates containing such compositions and to methods for preparing such substrates.

2. Description of the Prior Art

The resinous reaction products mentioned above are known to increase the wet strength of various cellulosic substrates. In many applications, however, dry strength must also be increased. Generally, these resinous compositions alone do not satisfactorily improve dry strength.

BRIEF DESCRIPTION OF THE INVENTION

In accordance with this invention, it has been surprisingly found that certain compositions not only increase the wet strength of paper but also increase the dry strength. These compositions comprise I. an uncured, thermosetting resinous reaction product of
A. an adduct of
1. a dihaloalkane represented by the formula

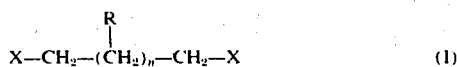

(I)

wherein X represents chloro, bromo, or iodo, R is hydrogen, hydroxy or an alkyl group having 1 to 4 carbon atoms, and $n$ is 0 or 1 and
2. a polyalkylenepolyamine represented by the formula

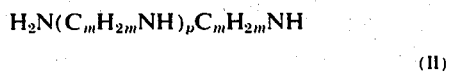

(II)

wherein $m$ is an integer of from 4 to about 15 and $p$ is 0 or 1 in a mole ratio of from about 0.5:1 to about 0.95:1 and
B. an epihalohydrin selected from the group consisting of epichlorohydrin, epibromohydrin, and epiiodohydrin, in a mole ratio of from about 1.25 to about 2.5 moles of epihalohydrin per mole of amine group in said adduct, the reaction product being present in an amount of from about 5% by weight to about 40% by weight, based on the total weight of the composition,
II. a polyanionic phosphorus compound, present in an amount of from about 0.1% to about 20% by weight, based on the weight of the resinous reaction product and
III. water, present in an amount of from about 60 to 95% by weight, based on the total weight of the composition.

Surprisingly, the cationic resinous reaction product and the polyanionic phosphorus compound have a cooperative effect to give better dry strength than either alone.

In another embodiment of this invention, there is provided cellulosic substrates containing the aforementioned resinous reaction products and polyanionic phosphorus compounds. Of course, the resinous reaction products are cured after application to the cellulosic substrates. These substrates have improved wet and dry strength.

Another embodiment of this invention provides a method for preparing the above cellulosic substrates.

DETAILED DESCRIPTION OF THE INVENTION

Adducts used in the practice of this invention to prepare the resinous reaction products are formed by reacting dihaloalkanes with polyalkylenepolyamines. Illustrative dihaloalkanes represented by Formula I include when $n$ is 0 1,2-dichloroethane 1,2-dibromoethane, 1,2-diiosoethane; and when $n$ is 1 include 1,3-diiodopropane, 1,3-dichloro-2-methyl propane, 1,3-dibromo-2-butyl propane, 1,3-dichloro-2-isobutyl propane, 1,3-dichloro-2-hydroxy-methyl propane, and 1,3-dibromo-2-hydroxy propane. It is preferred that $n$ be 0 and 1,2-dichloroethane is especially preferred.

$\alpha,\omega$-dihaloalkanes containing more than 6 carbon atoms between the halosubstituents may be used in the same manner to form adducts possessing substantially the same properties as adducts formed using $\alpha,\omega$-dihaloalkanes represented by Formula I. These $\alpha,\omega$-dihaloalkanes are equivalents of those represented by Formula I. Examples include 1,7-dichloroheptane, 1,5-dibromopentane and 1,12-dichlorododecane.

Likewise, $\alpha,\omega$-dihaloalkanes containing 2,3 or more than 6 carbon atoms between the halosubstituents and containing 1 or more simple substituents may be used in the same manner to form adducts possessing substantially the same properties as adducts formed using the $\alpha,\omega$-dihaloalkanes represented by Formula I. These substituents include lower alkyl; e.g., methyl, ethyl, butyl; nitro; sulfato sulfonyloxy; carboxy; carbo-lower-alkoxy, e.g., carbo-methoxy, carbethoxy; amido; hydroxy; lower-alkoxy, e.g., methoxy, ethoxy, and lower-alkanoxyloxy, e.g., acetoxy.

The aforementioned dihaloalkanes are reacted with polyalkylenepolyamines to form adducts. Illustrative polyalkylenepolyamines represented by Formula II where $p$ is 0 include 1,4-tetramethylenediamine, 1,5-pentamethylenediamine, 1,6-hexamethylenediamine, 1,10-decamethylenediamine, 1,12-dodecamethylenediamine, 1,15-pentadecylmethylenediamine; and where $p$ is 1 include bistetramethylenetriamine, bishexamethylenetriamine, bisheptamethylenetriamine, bisnonamethylenetriamine, bispentadecylmethylenetriamine. It is preferred that $p$ be 0 and that $m$ be from 4 to 10; 1,6-hexamethylenediamine is especially preferred.

Polyalkylenepolyamines containing 15 or more carbon atoms between the amine groups or polyalkylenepolyamines containing 4 or more carbon atoms between the amine groups and 1 or more simple substituents may be used in the same manner to form adducts possessing substantially the same properties as adducts formed using polyalkylenepolyamines represented by Formula II. These polyalkylenepolyamines are equivalents of those represented by Formula II. Examples of polyalkylenepolyamines containing more than 15 carbon atoms include 1,19-nonadecyldiamine. Some of the simple substituents include lower alkyl, e.g., methyl, ethyl, butyl; nitro; sulfato; sulfonyloxy; carboxy; carbo-lower-alkoxy, e.g., carbomethoxy, carboethoxy; amido; hydroxy; lower-alkoxy, e.g., methoxy, ethoxy and lower-alkanoyloxy, e.g., acetoxy.

The adducts can be prepared by reacting a dihaloalkanes defined by Formula I with a polyalkylenepolyamine defined by Formula II according to the procedure described in U.S. Pat. No. 2,834,675 which is incorporated herein by reference.

For example, the dihaloalkanes are reacted with the polyalkylenepolyamines in the aforementioned ratios at a temperature range of from about 25°C to reflux or above preferably from about 60°C to 90°C in a solvent such as water, water miscible alcohols or mixtures thereof. Water is preferred. Any suitable solids contents of the reactants in the reaction mixture may be employed. It is most advantageous that initially they be high, 60 to 90% by weight, based on the total weight of the reaction mixture.

As the reaction proceeds, the viscosity increases, it is conveniently kept from G to S on the Gardner-Holdt scale by the addition of solvent. Viscosity is measured at 25°C. In order to maintain a reasonable reaction rate any strong base or other acid acceptor may be added to neutralize any HCL formed. These bases include alkali metal hydroxides or alkali metal alkoxides.

The reaction is carried out until there are substantially no free dihaloalkanes present in the reaction mixture.

The adducts contain essentially linear or branched units with little or no cyclic units. It is preferred that about 85% of the units of the adducts be linear or branched with more than 95% being preferred.

Using water as a solvent, aqueous solutions of the adduct are obtained. They are clear, pale yellow having a pH of from about 8 to 11 at 25°C.

Any concentration of the adduct can be used as long as it is suitable for further reaction with the epihalohydrin. A suitable concentration of adduct is from about 25 to 55% by weight, based on the total weight of the solution of adduct. Likewise, the concentration may be adjusted by the addition or removal of solvent to give any desired viscosity. For example, a viscosity of about A to H on the Gardner-Holdt scale at 25°C is suitable for reacting with epihalohydrin.

As mentioned, the adducts contain essentially linear or branched units. α,ω-dihaloalkanes containing 4 to 6 carbon atoms between the halosubstituents form adducts containing essentially all cyclic units. Likewise, di or triamines containing less than 4 carbon atoms between the amine groups tend to form adducts containing essentially all cyclic units. Adducts containing a major proportion of cyclic units are not suitable in the practice of this invention. However, a minor proportion, i.e., 15 to 20% of the adduct of this invention may be replaced with adducts containing essentially all cyclic units.

The above mentioned adducts are reacted with certain epihalohydrins to form the resinous reaction products. These epihalohydrins are epichlorohydrin, epibromohydrin or epiiodohydrin.

The resinous reaction products can be formed by reacting the adduct with epihalohydrin according to the procedure described in U.S. Pat. No. 2,595,935 which is incorporated herein by reference.

For example, epihalohydrin is added to the adduct in the presence of a solvent such as water, water miscible alcohols or mixtures thereof at a temperature range of from about 25° to 45°C preferably from about 25° to 35°C over a period of 10 minutes to 120 minutes preferably 30 minutes to 90 minutes. The solids concentration of the reactants in the reaction mixture during the reaction is from about 20% to about 60% by weight, preferably from about 30% to about 40%, based on the total weight of the reaction mixture. After addition is complete, the temperature is raised by the addition of heat to about 60° to about 80°C. Reaction is continued at this temperature range by the addition of more heat until the resinous reaction product reaches a viscosity at 40% resin solids measured at 25°C on the Gardner-Holdt scale within the order of A to about Z preferably from about D to about H. The pH is reduced by the addition of a suitable acidic substance, well known to those skilled in the art such as $H_2SO_4$, HCl, etc.

Preferably, the resinous reaction products are produced using water as a solvent. For ease and convenience, this reaction is run such that the aqueous solution obtained by reacting the adduct with the epihalohydrin contains about 40% resin solids. Resin solids of the aqueous solution are determined by totaling the weight of the reactants employed and any water added, and then dividing by the total weight of the solution. By controlling the reaction, aqueous solutions are obtained having any viscosity. Generally, they have a viscosity at 40% resin solids on the Gardner-Holdt scale at 25°C of from A to Z, preferably D to H.

Aqueous solutions may be adjusted to any resin solids concentration to facilitate use. Solutions having a resin solids level of from about 5 to 40%, preferably 20 to 35% and a pH lower than 6 at 25°C are stable for extended periods of time, i.e., over 3 months. A pH of 4.5 to 5.5 is preferred. Generally, the pH is always at least 3, so the solutions can be used in stainless steel equipment.

Generally, aqueous solutions of the resinous reaction products in which the epihalohydrin is reacted with the adduct in a molar proportion of epihalohydrin to amine group of the adduct about 2.5:1 are not thermosetting and those below 1.25:1 generally gel. Preferably, the mole proportion is from about 1.5:1 to about 2.25:1.

Specific examples of the adducts and the resinous reaction products are given in our copending U.S. patent application, Ser. No. 318,819, Tables I and II, which application is incorporated herein by reference.

The polyanionic phosphorus compounds that can be used in the compositions of this invention include any of those well-known polyanionic phosphorus compounds. Illustrative of these include the amino phosphonic acids and their water soluble salts, the alkylene diphosphonic acids and their water soluble salts or the alkali metal polyphosphates.

Amino phosphonic acids that can be used are represented by the following formula

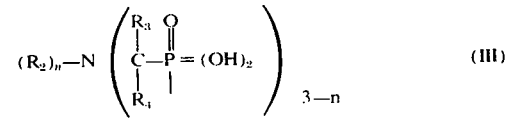

wherein $n$ is 0 or 1, $R_2$ represents hydrogen, aliphatic hydrocarbon, hydroxysubstituted hydrocarbon, carboxy methylene or

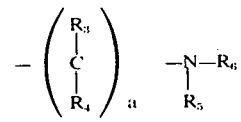

wherein $a$ represents an integer from 1 to 30, $R_3$ and $R_4$ independently represent hydrogen or alkyl, $R_5$ represents hydrogen or

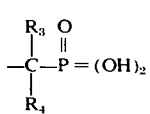

$R_6$ represents

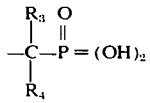

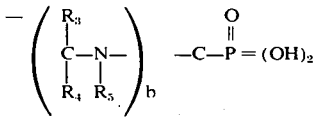

$b$ represents an integer from 1 to 30.

With respect to Formula III, when $R_2$ is either an aliphatic hydrocabron, or hydroxy-substituted aliphatic hydrocarbon, it is preferably either the saturated or double-bonded unsaturated form containing from 1 to 4 carbon atoms. When either $R_3$ or $R_4$ is an alkyl group it is preferred that the alkyl group contains from 1 to about 4 carbon atoms.

One of the preferred classes of the foregoing amino phosphonic acids are the amino tri(lower alkylidene phosphonic acids) or the water-soluble salts thereof and which acids have the general formula:

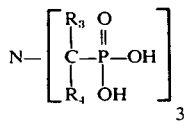

wherein $R_3$ and $R_4$ are the same as defined above.

The following compounds are presented as being illustrative of the amino phosphonic acids of Formula III.

$N(CH_2PO_3H_2)_3$
$N[C(CH_3)(CH_3)PO_3H_2]_3$
$CH_3N(CH_2PO_3H_2)_2$
$C_4H_9N(CH_2PO_3H_2)_2$
$(H_2O_3PCH_2)_2NCH_2CH_2N(CH_2PO_3H_2)_2$
$(H_2O_3PCH_2)_2NCH_2CH_2N(CH_2PO_3H_2)CH_2CH_2N(CH_2PO_3H_2)_2$
$(H_2O_3PCH_2)_2NCH_2CH_2[N(CH_2PO_3H_2)(CH_2CH_2)]_2N(CH_2PO_3H_2)_2$
$OHCH_2CH_2N(CH_2PO_3H_2)_2$
$(H_2O_3PCH_2)_2N(CH_2)_6N(CH_2PO_3H_2)_2$
$(H_2O_3PCH_2)_2N(CH_2)_{10}N(CH_2PO_3H_2)_2$
$C_3H_6N(CH_2PO_3H_2)_2$
$OHCH_2(CH_2)_{13}N(CH_2PO_3H_2)_2$
$(H_2O_3PCH_2)_2N(CH_2)_6N(CH_2PO_3H_2)(CH_2)_6N(CH_2PO_3H_2)_2$

Alkylene diphosphonic acids that may be used are presented by the formula

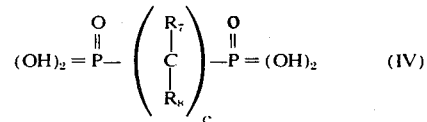

wherein $c$ is an integer from 1 to 10, $R_7$ represents hydrogen or lower alkyl and $R_8$ represents hydroxyl, hydrogen or lower alkyl. Lower alkyl groups contain 1 to 4 carbon atoms.

Compounds illustrative of the alkylene diphosphonic acids of Formula IV include the following:

$(OH)_2(O)PCH_2P(O)(OH)_2$
$(OH)_2(O)PCH(CH_3)P(O)(OH)_2$
$(OH)_2(O)PC(CH_2CH_3)P(O)(OH)_2$
$(OH)_2(O)PC(OH)(CH_3)P(O)(OH)_2$
$(OH)_2(O)PCH_2(CH_2)_4CH_2P(O)(OH)_2$
$(OH)_2(O)P(CH_2)_3P(O)(OH)_2$
$(OH)_2(O)P(CH_2)_{10}P(O)(OH)_2$
$(OH)_2(O)PC(OH)(CH_2CH_3)P(O)(OH)_2$
$(OH)_2(O)PC(CH_3)(OH)(CH_2)_4C(CH_3)(OH)P(OH)_2$

Procedures for preparing the above phosphonic acids are described in U.S. Pat. No. 3,629,124 which is incorporated herein by reference.

Other polyanionic phosphorous compounds include the alkali metal polyphosphates. They include sodium tripolyphosphate and potassium tripolyphosphate. Sodium tripolyphosphate is preferred.

The amount of polyanionic polyphosphorus compound used in the practice of this invention is from about 0.1% to about 20%, preferably 5% to 15% by weight, based on the weight of the resinous reaction product in the composition.

Water is present in the compositions of this invention in an amount 60 to 95%, preferably 65 to 80%, based on the total weight of the composition.

Compositions of this invention generally contain 5% to about 40% by weight of the uncured cationic thermosetting resinous reaction product, preferably 20 to 35%.

The compositions of the instant invention may be prepared in any convenient manner, for example, the polyanionic substance can be simply added to the resinous reaction product. Since some of the polyanionic substances are acidic, they may be used instead of the above mentioned acids to reduce the pH of the resinous reaction products. This procedure is preferred.

Compositions of the instant invention are shown in Table I below. They contain about 25% resinous reaction product, 10% by weight based on the weight of the resinous reaction product of polyanionic phosphorus compound and about 72.5% by weight of water based on the total weight of the composition.

TABLE I

COMPOSITIONS OF THIS INVENTION

| Sample | Resinous Reaction Product | | Epihalo-hydrin | Mole** Ratio | Polyanionic Phosphorus Compound |
|---|---|---|---|---|---|
| | Adduct | Mole* Ratio + | | | |
| A | 1,3-dichloro-2-hydroxy propane + | 0.7 | Epichloro-hydrin | 2.0 | $N(CH_2PO_3H_2)_3Na$ Salt |

TABLE I—Continued

COMPOSITIONS OF THIS INVENTION

| Sample | Resinous Reaction Product Adduct | Mole* Ratio + | Epihalo-hydrin | Mole** Ratio | Polyanionic Phosphorus Compound |
|---|---|---|---|---|---|
| B | 1,6-hexamethylenediamine<br>1,3-dichloro-2-ethyl propane<br>+<br>1,10-decamethylenediamine | 0.85 | Epiiodo-hydrin | 1.5 | $CH_3C(OH)(PO_3H_2)_2$ |
| C | 1,2-dichloroethane<br>+<br>1,6-hexamethylenediamine | 0.90 | Epichloro-hydrin | 1.75 | $(H_2O_3PCH_2)_2N(CH_2)_2N(CH_2PO_3H_2)_2$ Potassium Salt |
| D | 1,3-dichloro-2-butyl propane<br>+<br>1,8-octamethylenediamine | 0.6 | Epibromo-hydrin | 1.25 | $(H_2O_3PCH_2)_2N(CH_2)_6N(CH_2PO_3H_2)_2$ Potassium Salt |
| E | 1,2-dibromopropane<br>+<br>1,14-tetradecamethylene diamine | 0.95 | Epichloro-hydrin | 2.25 | $CH_3C(OH)(PO_3H_2)_2$ |
| F | 1,2-dibromoethane<br>+<br>bis-hexamethylenediamine | 0.5 | Epibromo-hydrin | 1.87 | $N(CH_2PO_3H_2)_3$ Na Salt |
| G | 1,3-dichloro-2-butyl propane<br>+<br>bis-tridecamethylenediamine | 0.75 | Epichloro-hydrin | 2.0 | $N(CH_2PO_3H_2)_3$ Na Salt |

*moles of dihaloalkane per mole of polyalkylenepolyamine
**moles of epihalohydrin per mole of amine group in said polyalkylenepolyamine Other compositions of the instant invention contain, in place of any of the polyanionic phosphorus compounds in the above mentioned compositions, an equivalent amount of $CH_3N(CH_2PO_3H_2)_2$, $(OHCH_2CH_2N(CH_2PO_3H_2)_2$, $(OH)_2(O)(OH)_2(O)PCH(CH_3)P(O)(OH)$, $(H_2O_3PCH_2)_2N(CH_2)_{10}N(CH_2PO_3H_2)_2$, $(OH_2(O)PC(OH)(CH_2CH_3)P(O)(OH)_2$ and potassium tripolyphosphate.

Still other compositions of the instant invention contain in place of any of the polyalkylene polyamines in the above compositions 1,5-pentamethylenediamine, 1,7-heptamethylenediamine, 1,12-dodecamethylenediamine, bisheptamethylenetriamine and bistetradecamethylenetriamine.

As stated above, the compositions of this invention are particularly valuable as wet and dry strength improvers for cellulosic substrates, particularly paper. Paper, in accordance with this invention, includes all materials which are emcompassed within the ordinary and usual meaning of the word. Generally speaking, paper includes cellulosic and other vegetable fibers formed into thin felts or nonwoven sheets.

When the compositions of this invention are applied to cellulosic paper products of various types conventional techniques known to those skilled in the art may be used. Thus, for example, preformed and partially or completely dried paper may be impregnated by immersion in, or spraying with, an aqueous solution of the composition following which the paper may be heated for about 0.5 to 30 minutes at temperatures of 90°C to 100°C or higher to dry same and cure the resin to a water insoluble condition. The resulting paper has increased wet and dry strength and, therefore, this method is well suited for the impregnation of paper towels, absorbent tissue and the like as well as wrapping paper, bag paper and the like to impart wet strength characteristics thereto.

The preferred method of incorporating these compositions in paper, however, is by internal addition prior to sheet formation whereby advantage is taken of the substantivity of the resins for hydrated cellulosic fibers. In practicing this method, the composition in its uncured and hydrophilic state is added to an aqueous suspension of paper stock in the beater, stock chest, Jordan engine, fan pump, head box or at any other suitable point ahead of sheet formation. The sheet is then formed and dried in the usual manner, thereby curing the resin to its polymerized and water insoluble condition and imparting wet strength to the paper.

It is not necessary that a physical mixture of the resinous reaction product and the polyanionic phosphorus be added to the paper pulp. Each may be added separately. For example, a solution of the resinous reaction product and a solution of the polyanionic phosphorus compound may be added to the aqueous suspension of the paper stock.

The compositions of this invention herein disclosed impart wet and dry strength to paper when present therein in amounts of about 0.1–5% or more based on the dry weight of the paper. The quantity of the composition to be added to the aqueous stock suspension will depend on the degree of wet and dry strength desired in the finished product and on the amount of resin retained by the paper fibers.

When added separately, generally about 0.1 to 5% or more of the resinous reaction product based on the weight of the fiber and 0.1 to 20% of the polyanionic phosphorus compound, based on the weight of the resinous reaction product, preferably 5 to 15% is used.

The uncured cationic thermosetting resins of the invention, incorporated in paper in any suitable manner, as described above, may be cured under acid, neutral or alkaline conditions, i.e., at pH's from about 4.0 to 11 by subjecting the paper to a heat-treatment for about 0.5 to 30 minutes at a temperature from about 90° to 100°C. Optimum results, however, are obtained under alkaline conditions. For example, in those applications where short cure times are required, for example, fine papers such as sanitary tissues, the resinous compositions may be made alkaline (pH 8 11) prior to use. Such a pretreatment results in shorter cure times and increased wet strength. Any strong base may be used such as alkali metal hydroxides or alkoxides. Sodium hydroxide is preferred.

The following Examples illustrate the invention.

EXAMPLE I

Fifty-eight grams (0.5 mole) of 1,6-hexamethylenediamine is placed in a 4-necked flask equipped with a thermometer, mechanical stirrer, condenser and an additional funnel. To this is added 10.2 grams of water and the mixture heated externally to 70°C. Forty-two grams (0.43 mole) of 1,2-dichloroethane is added at a rate slow enough to keep the reaction temperature below 75°C, ~3 hours addition time. Water, 8 grams at a time, is added during this 3 hr. period to keep the reaction viscosity below Gardner S. When the addition of 1,2-dichloroethane is complete, add 8 grams of 50% aqueous sodium hydroxide. Maintain the reaction at 70°C until the viscosity reaches Gardner V. At this point, add 8 grams of water and raise the temperature to 80°C. Maintain 80°C until the viscosity reaches Gardner T. Add 315 grams of water and cool the mixture to 25°C. To this mixture, over a 1 hr. period, add 184.8 grams (2 moles) of epichlorohydrin allowing the reaction temperature to raise to 45°C. After an additional hour at 45°C, raise the reaction temperature to 65°C and maintain until the viscosity of the solution reaches Gardner D. At this viscosity, add 9 grams of 98% by weight sulfuric acid and 227 grams of water. Adjust the final pH to ~5 and the final solids to 25% with additional sulfuric acid and water.

An actual experimental run (A) of the above procedure yielded 1200 grams of a solution containing 25% resin solids and having a pH of 4.5 at 25°C.

In another actual experimental run (B), the above procedure was repeated except in place of the sulfuric acid was added 150 grams of 10% by weight solution of aminotrimethylene phosphonic acid. It yielded 1200 grams of a solution containing 25% resin solids and having a pH of 4.5 at 25°C.

EXAMPLE II

In actual experimental runs, aqueous solutions of the resinous reaction products and the polyanionic phosphorus compounds set out in Table II below were separately added to aqueous pulp slurries containing 24 grams of pulp. The cationic resinous reaction products were added in an amount of 0.75% by weight based on the weight of the dry pulp and the polyanionic phosphorus compounds were added in an amount of 10% by weight based on the weight of the reaction product. The pulp had a 0.5% consistency and was composed of 50% bleached softwood and 50% Lincoln hardwood fibers beaten to a Canadian standard freeness of 550 ml at a pH of 7.0. After the compositions were added, the pulp slurries were readjusted to pH 7.0 and stirred briefly to allow the resin to distribute on the pulp. The fibers were formed into a wet-fluid web having a consistency of 34.7 on a Noble and Woods handsheet machine. The wet sheets were pressed on a material felt and dried for 2 minutes on a lab drum drier at 204° C. The resulting 2.5 grams, 8 × 8 inch handsheets were cut into 1 × 8 inch strips. The strips were tested as is for dry strength or over cured for 10 minutes at 105°C for wet strength. The cured strips were soaked 10 minutes in tap water before testing.

TABLE II

| Composition Resin | Additive | Dry Tensile Average | | Wet Tensile Average | |
|---|---|---|---|---|---|
| — | — | 11.6, 12.2 | 11.9 | 8.28, 0.35, | 0.30 |
| Ex. 1, Run A | — | 14.2, | | 3.29 | |
| — | $N(CH_2PO_3H_2)_3$ | 12.0, 12.6 | 12.3 | 0.21, 0.30 | 0.26 |
| Ex. 1, Run A | $N(CH_2PO_3H_2)_3$ | 16.4, 16.3 | 16.4 | 3.89, 3.86 | 3.88 |

EXAMPLE III

In an actual experimental run, the procedure of Example II was followed for the resinous reaction products and the polyanionic phosphorus compounds set out in Table III below.

TABLE III

| Composition Resin | Additive | Dry Tensile Average | | Wet Tensile Average | |
|---|---|---|---|---|---|
| Example 1, Run A | $(H_2O_3PCH_2)_2N(CH_2)_2N$ | 16.1, 16.4 | 16.2 | 3.87, 3.79 | 3.83 |
| Example 1, Run A | $(H_2O_3PCH_2)_2N(CH_2)_6$ $N(CH_2PO_3H_2)_2$ | 16.4, 15.8 | 16.1 | 3.79, 3.84 | 3.82 |
| Example 1, Run A | $CH_3C(OH)(PO_3H_2)_2$ | 16.4, 15.4 | 15.9 | 3.74, 3.71 | 3.72 |
| Example 1, Run A | Na Tripolyphosphate | 16.1, 16.1 | 16.1 | 3.92, 3.57 | 3.74 |

EXAMPLE IV

In an actual experimental run, the procedure of Example II was followed except an equivalent amount of the composition of Example I, run B was used in place of the cationic resinous reaction product and the polyanionic phosphorous compound.

From a consideration of the above specification, it will be appreciated that many improvements and modifications may be made without departing from the spirit and scope of the invention. It is to be understood, therefore, that the invention is in no way limited except as defined by the appended claims.

What is claimed is:

1. A composition for increasing the wet and dry strength of paper comprising
I. an uncured, thermosetting resinous reaction product of
A. an adduct of
   1. a dihaloalkane represented by the formula

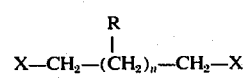

wherein X represents chloro, bromo or iodo, R is hydrogen, hydroxy or alkyl group having 1 to 4 carbon atoms, and $n$ is 0 or 1 and
   2. a polyalkylenepolyamine represented by the formula

wherein $m$ is an integer of from 4 to about 15 and $p$ is 0 or 1 in a mole ratio of from about 0.5:1 to about 0.95:1 and B. an epihalohydrin selected from the group consisting of epichlorohydrin, epibromohydrin, and epiiodohydrin, in a mole ratio of from about 1.25 to about 2.5 moles of epihalohydrin per mole of amine group in said adduct, said reaction product being present in an amount of from about 5% by weight to about 40% by weight based on the total weight of the composition, II. a polyanionic phosphorus compound, present in an amount of from about 0.1% to about 20% by weight, based on the weight of said resinous reaction product selected from the group consisting of (a)

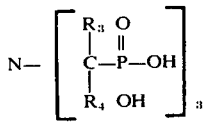

wherein $R_3$ and $R_4$ each independently is hydrogen or an alkyl group containing 1 to 4 carbon atoms, (b) water soluble salts thereof, (c)

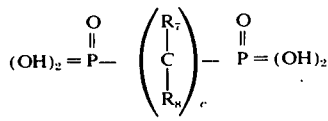

wherein $c$ is an integer from 1 to 30, $R_7$ represents hydrogen or lower alkyl, $R_8$ represents hydroxyl, hydrogen or lower alkyl, (d) water soluble salts thereof, and III. water, in an amount of from about 60 to 95% by weight, based on the total weight of the composition.

2. A composition according to claim 1 wherein X is chloro and $n$ is 0.

3. A composition according to claim 2 wherein $p$ is 0.

4. A composition according to claim 3 wherein $m$ is 4 to 10.

5. A composition according to claim 4 wherein the mole ratio of epihalohydrin to amine of said adduct is from about 1.5 to about 2.25 moles of epihalohydrin per mole of amine in said adduct.

6. A composition according to claim 5 wherein $m$ is 6.

7. A composition according to claim 6 wherein polyanionic phosphorus compound is selected from the group consisting of $N(CH_2PO_3H_2)_3$, $CH_3C(OH)(PO_3H_2)_2$, $(H_2O_3PCH_2)_2N(CH_2)_2N(CH_2PO_3H_2)_2$, $(H_2O_3PCH_2)_2N(CH_2)_6N(CH_2PO_3H_2)_2$, and water soluble salts thereof.

8. A composition according to claim 7 containing sufficient strong base to increase the pH to 9 to 13.

9. A composition according to claim 8 wherein the strong base is sodium hydroxide.

10. A cellulosic substrate having improved wet and dry strength which comprises a cellulosic substrate containing I. about 0.1 to about 5 weight percent based on the dry weight of the cellulosic fibers of a thermosetting resinous reaction product of A. an adduct of 1. a dihaloalkane represented by the formula

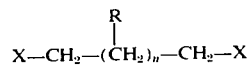

wherein X represents chloro, bromo, or iodo, R is hydrogen, hydroxy or an alkyl group having 1 to 4 carbon atoms, and $n$ is 0 or 1 and 2. a polyalkylenepolyamine represented by the formula

wherein $m$ is an integer of from 4 to about 15 and $p$ is 0 or 1 in a mole ratio of from about 0.5:1 to about 0.95:1 and B. an epihalohydrin selected from the group consisting of epichlorohydrin, epibromohydrin, and epiiodohydrin, in a mole ratio of from about 1.25 to about 2.5 moles of epihalohydrin per mole of amine group in said adduct, and II. a polyanionic phosphorus compound present in an amount of from 0.1% to about 20% by weight based on the weight of said resinous reaction product selected from the group consisting of (a)

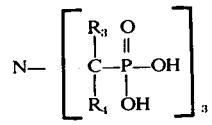

wherein $R_3$ and $R_4$ each independently is hydrogen or an alkyl group containing 1 to 4 carbon atoms, (b) water soluble salts thereof, (c)

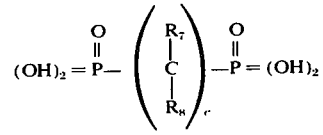

wherein $c$ is an integer from 1 to 30, $R_7$ represents hydrogen or lower alkyl, $R_8$ represents hydroxyl, hydrogen or lower alkyl, (d) water soluble salts thereof, said resinous reaction product having been cured after application of both the resinous reaction product and polyanionic phosphorus compound to the cellulosic substrate.

11. A Cellulasic substrate according to claim 10 wherein X is chloro and n is 0.

12. A Cellulasic substrate according to claim 11 wherein p is 0.

13. A Cellulasic substrate according to claim 12 wherein m is 4 to 10.

14. A cellulosic substrate according to claim 13 wherein said substrate is paper.

15. A Cellulosic substrate according to claim 14 wherein the mole ratio of epihalohydrin to amine in said adduct is from about 1.5 to about 2.25 moles of epihalohydrin per mole of amine in said adduct.

16. A Cellulosic substrate according to claim 15 wherein m is 6.

17. A Cellulasic substrate according to claim 16 wherein the polyanionic phosphorus compound is selected from the group consisting of $N(CH_2PO_3H_2)_3$, $CH_3C(OH)(PO_3H_2)_2$, $(H_2O_3PCH_2)_2N(CH_2)_2N(CH_2PO_3H_2)_2$, $(H_2O_3PCH_2)_2N(CH_2)_6N(CH_2PO_3H_2)_2$, and water soluble salts thereof.

18. A method for producing paper having improved wet and dry strength which comprises applying to said paper a composition comprising wherein $a$ represents an integer from 1 to 30, $R_3$ and $R_4$ independently represent hydrogen or alkyl, $R_5$ represents hydrogen or

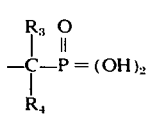

$R_6$ represents

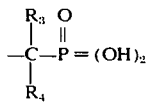

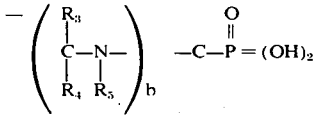

$b$ represents an integer from 1 to 30.

With respect to Formula III, when $R_2$ is either an aliphatic hydrocabron, or hydroxy-substituted aliphatic hydrocarbon, it is preferably either the saturated or double-bonded unsaturated form containing from 1 to 4 carbon atoms. When either $R_3$ or $R_4$ is an alkyl group it is preferred that the alkyl group contains from 1 to about 4 carbon atoms.

One of the preferred classes of the foregoing amino phosphonic acids are the amino tri(lower alkylidene phosphonic acids) or the water-soluble salts thereof and which acids have the general formula:

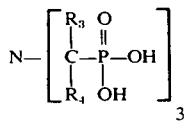

wherein $R_3$ and $R_4$ are the same as defined above.

The following compounds are presented as being illustrative of the amino phosphonic acids of Formula III.

$N(CH_2PO_3H_2)_3$
$N[C(CH_3)(CH_3)PO_3H_2]_3$
$CH_3N(CH_2PO_3H_2)_2$
$C_4H_9N(CH_2PO_3H_2)_2$
$(H_2O_3PCH_2)_2NCH_2CH_2N(CH_2PO_3H_2)_2$
$(H_2O_3PCH_2)_2NCH_2CH_2N(CH_2PO_3H_2)CH_2CH_2N(CH_2PO_3H_2)_2$
$(H_2O_3PCH_2)_2NCH_2CH_2[N(CH_2PO_3H_2)(CH_2CH_2)]_2N(CH_2PO_3H_2)_2$
$OHCH_2CH_2N(CH_2PO_3H_2)_2$
$(H_2O_3PCH_2)_2N(CH_2)_6N(CH_2PO_3H_2)_2$
$(H_2O_3PCH_2)_2N(CH_2)_{10}N(CH_2PO_3H_2)_2$
$C_3H_6N(CH_2PO_3H_2)_2$
$OHCH_2(CH_2)_{13}N(CH_2PO_3H_2)_2$
$(H_2O_3PCH_2)_2N(CH_2)_6N(CH_2PO_3H_2)(CH_2)_6N(CH_2PO_3H_2)_2$

Alkylene diphosphonic acids that may be used are presented by the formula

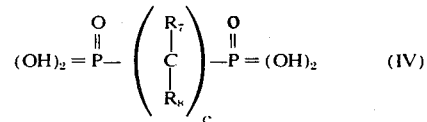

wherein $c$ is an integer from 1 to 10, $R_7$ represents hydrogen or lower alkyl and $R_8$ represents hydroxyl, hydrogen or lower alkyl. Lower alkyl groups contain 1 to 4 carbon atoms.

Compounds illustrative of the alkylene diphosphonic acids of Formula IV include the following:

$(OH)_2(O)PCH_2P(O)(OH)_2$
$(OH)_2(O)PCH(CH_3)P(O)(OH)_2$
$(OH)_2(O)PC(CH_2CH_3)P(O)(OH)_2$
$(OH)_2(O)PC(OH)(CH_3)P(O)(OH)_2$
$(OH)_2(O)PCH_2(CH_2)_4CH_2P(O)(OH)_2$
$(OH)_2(O)P(CH_2)_3P(O)(OH)_2$
$(OH)_2(O)P(CH_2)_{10}P(O)(OH)_2$
$(OH)_2(O)PC(OH)(CH_2CH_3)P(O)(OH)_2$
$(OH)_2(O)PC(CH_3)(OH)(CH_2)_4C(CH_3)(OH)P(OH)_2$

Procedures for preparing the above phosphonic acids are described in U.S. Pat. No. 3,629,124 which is incorporated herein by reference.

Other polyanionic phosphorous compounds include the alkali metal polyphosphates. They include sodium tripolyphosphate and potassium tripolyphosphate. Sodium tripolyphosphate is preferred.

The amount of polyanionic polyphosphorus compound used in the practice of this invention is from about 0.1% to about 20%, preferably 5% to 15% by weight, based on the weight of the resinous reaction product in the composition.

Water is present in the compositions of this invention in an amount 60 to 95%, preferably 65 to 80%, based on the total weight of the composition.

Compositions of this invention generally contain 5% to about 40% by weight of the uncured cationic thermosetting resinous reaction product, preferably 20 to 35%.

The compositions of the instant invention may be prepared in any convenient manner, for example, the polyanionic substance can be simply added to the resinous reaction product. Since some of the polyanionic substances are acidic, they may be used instead of the above mentioned acids to reduce the pH of the resinous reaction products. This procedure is preferred.

Compositions of the instant invention are shown in Table I below. They contain about 25% resinous reaction product, 10% by weight based on the weight of the resinous reaction product of polyanionic phosphorus compound and about 72.5% by weight of water based on the total weight of the composition.

TABLE I

COMPOSITIONS OF THIS INVENTION

| Sample | Resinous Reaction Product | | Epihalo-hydrin | Mole** Ratio | Polyanionic Phosphorus Compound |
| | Adduct | Mole* Ratio + | | | |
| --- | --- | --- | --- | --- | --- |
| A | 1,3-dichloro-2-hydroxy propane + | 0.7 | Epichloro-hydrin | 2.0 | $N(CH_2PO_3H_2)_3Na$ Salt |

UNITED STATES PATENT OFFICE
CERTIFICATE OF CORRECTION

PATENT NO. : 3,899,388
DATED : August 12, 1975
INVENTOR(S) : John P. Petrovich & David L. Taylor It is certified that error appears in the above-identified patent and that said Letters Patent are hereby corrected as shown below:

Column 4, line 55,

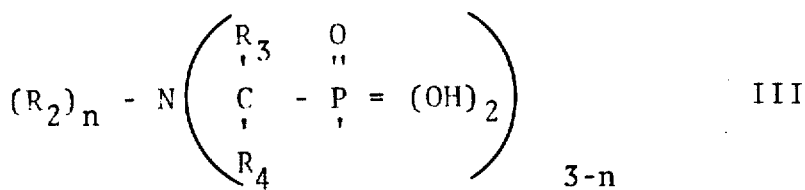

should be ---

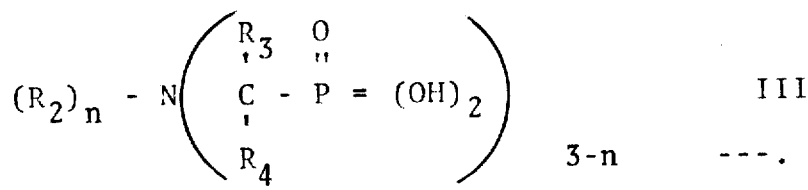

Column 7, line 30, "$(OHCH_2CH_2N(CH_2PO_3H_2)_2$" should be --- $OHCH_2CH_2N(CH_2PO_3H_2)_2$ ---.

Column 7, line 32, "$(OH_2(O)PC(OH)(CH_2CH_3)P(O)(OH)_2$" should be --- $(OH)_2(O)PC(OH)(CH_2CH_3)P(O)(OH)_2$ ---.

Columns 9 & 10 (Table III), between lines 30 and 31, the following line should be inserted --- $(CH_2PO_3H_2)_2$ K Salt ---.

Column 8, line 63, "(pH 811)" should be --- (pH 8 - 11) ---.

UNITED STATES PATENT OFFICE
CERTIFICATE OF CORRECTION

PATENT NO. : 3,899,388
DATED : August 12, 1975
INVENTOR(S) : John P. Petrovich & David L. Taylor It is certified that error appears in the above-identified patent and that said Letters Patent are hereby corrected as shown below:

Column 11, line 15, " 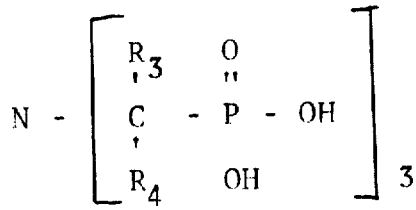 "

should be --- 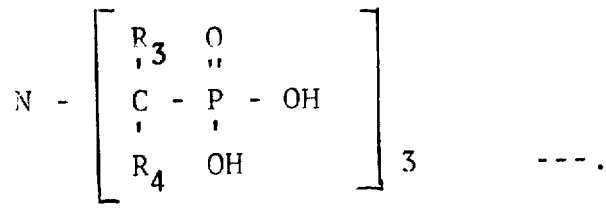 ---.

Column 12, line 47, "Cellulasic" should be --- Cellulosic ---.

Column 12, line 49, "Cellulasic" should be --- Cellulosic ---.

Column 12, line 51, "Cellulasic" should be --- Cellulosic ---.

Signed and Sealed this sixteenth Day of December 1975

[SEAL]

Attest:

RUTH C. MASON
*Attesting Officer*

C. MARSHALL DANN
*Commissioner of Patents and Trademarks*